United States Patent Office 3,073,796
Patented Jan. 15, 1963

3,073,796
CURED RESIN FROM EPOXIDIZED POLYBUTADIENE, UNSATURATED DICARBOXYLIC ACID ANHYDRIDE AND POLYHYDRIC ALCOHOL
Murray H. Reich and Gene Nowlin, Princeton, N.J., assignors to FMC Corporation, a corporation of Delaware
No Drawing. Filed Aug. 21, 1959, Ser. No. 835,182
17 Claims. (Cl. 260—45.4)

This invention relates to novel epoxypolybutadienes, and particularly to new and improved epoxypolybutadienes cured with a novel curing composition and procedure.

It is well known that various polymeric structures containing epoxy groups may be cured, by cross-linking with polyfunctional curing agents, to form polymeric products of very high molecular weight. It is also known that polymers and copolymers of butadiene may be epoxidized, to form products which contain both epoxy groups and some residual unsaturation. The curing of these epoxypolybutadienes to form high molecular weight products, by reacting with polyfunctional curing agents such as polyamines and polycarboxylic acids and anhydrides, has been the subject of much recent investigation. Each of the various types of curing agents which may be used to cure epoxy-containing resins offers certain advantages and, conversely, each is accompanied by certain disadvantages in particular applications.

Of particular interest in the curing of epoxypolybutadienes is their curing behavior with carboxylic acids and anhydrides, since these curing agents react rapidly and under mild conditions with epoxypolybutadienes. These compositions are described in United States Patent 2,829,135 of Greenspan and Pepe. Although anhydride-cured epoxypolybutadienes offer a number of advantages over other typical curing agents, they tend to be brittle and to have a short pot life, so that in practice their use is somewhat limited.

In patent application Serial No. 815,301, filed May 25, 1959, is described an improved epoxypolybutadiene composition cured with a combination of a polycarboxylic anhydride and an aliphatic polyhydric alcohol; this curing composition offers a number of advantages over the use of anhydrides alone, providing not only substantially improved mechanical and other properties in the cured products, but also improved pot life and handling characteristics.

It has now been discovered that substantially improved epoxypolybutadienes, having unusual thermal stability and other improved properties, and rapid rates of cure, are obtained by employing a novel curing system containing an unsaturated polycarboxylic anhydride having a polymerizable double bond, an aliphatic polyol, and a free radical initiating agent.

By employing the curing composition and procedure of this invention, cured epoxypolybutadienes having higher heat distortion temperatures than previously available are produced. These improved properties are obtained in relatively short cure times, and the time required for complete cure is shortened. Products having substantially improved stability and resistance to the action of solvents, boiling water, high temperatures, and weathering are obtained. As an additional and unexpected advantage, the epoxypolybutadienes used as the base resin may be of lower epoxy content and higher unsaturation than was heretofore necessary to obtain cured products of optimum properties. With known curing agents, products prepared from epoxypolybutadienes of low epoxy content were heretofore unsatisfactory for many applications, particularly because of their low heat distortion points. By thus upgrading the polybutadiene, the overall process for the preparation, epoxidation and curing of polybutadienes is made substantially more efficient and economical.

The base resin for the instant composition is a liquid polymer or copolymer of butadiene which has been epoxidized. The polybutadiene itself may be prepared by any of a number of well known methods, such as emulsion or solution polymerization using a wide variety of catalysts, including free radical, alkali metal, Friedel-Crafts and organo-metallic catalysts. Best results are generally obtained with liquid polymers having a molecular weight below about 2500, corresponding to a viscosity below about 50 poises measured at zero shear and 25° C., since higher polymers are very viscous when epoxidized to a high epoxy content and thus not easily worked. When epoxidized to a lower epoxy content, higher molecular weight polymers may of course be used, and at epoxy contents as low as 1 or 2%, polybutadienes and copolymers having a molecular weight of 10,000 and higher may be used. The lower limit of the molecular weight range for these polymers is about 100; that is, mixtures of dimers and trimers could actually be used, should they be desired to impart particular properties for special applications. In general, a convenient and preferred molecular weight range for the polybutadienes and copolymers is in the range of about 250 to 5000. Polymers outside of the molecular weight ranges described may also be used, but in the high molecular weight ranges and for solid polymers it is generally necessary to dissolve the polymer in a solvent before carrying out the epoxidation and curing, and for certain applications, such as in coatings, this procedure may actually be preferred. Useful techniques for the polymerization and copolymerization of butadiene, are described in U.S. Patents 2,631,175 and 2,791,618.

For the epoxidation of the polybutadienes and copolymers thereof, standard epoxidation techniques may be used. Aliphatic, aromatic, and inorganic peracids, salts of the peracids, peroxides and hydroperoxides are the most common of the effective epoxidizing agents.

For convenience, lower aliphatic peracids, such as performic, peracetic, perpropionic and perbutyric are preferred reagents. With this reagents, the epoxidation reaction may be carried out using a preformed peracid, or the peracid may be formed in the reaction medium, generally by adding hydrogen peroxide to an aliphatic acid or anhydride medium. Peracids may be prepared in any known way, such as is described in "Organic Syntheses," Coll. Volume I, Second Edition, John Wiley and Sons (1941), page 431. A number of epoxidation techniques for polybutadiene are illustrated in an article by C. W. Wheelock in Industrial and Engineering Chemistry, 50, 299–304 (1958).

The epoxidation may be conducted using stoichiometric amounts of the peracid: that is, one mole of hydrogen peroxide or peracid per double bond in the polymer; or amounts below that theoretically required may be used. There is no significant advantage to using excess oxidant and, although the reactivity and properties of the epoxidized polybutadienes do vary with the degree of oxidation, it has been found that the use of as little as 5% of the theoretical amount of peracid will produce useful resins. In general, the epoxidized polybutadienes used herein contain at least 1% by weight of epoxy oxygen, and it is preferred for most applications to employ epoxypolybutadienes having about 4 to 10% epoxy oxygen by weight. Epoxypolybutadienes containing more than 10% epoxy oxygen tend to be extremely viscous, especially in the higher molecular weight range; but this may actually be desired for special applications, such as coatings. As stated above, the viscosity of epoxypolybutadiene is increased by increasing the molecular weight of the base polymer or copolymer; and of course the viscosity of a particular epoxy resin may be lowered by the appropriate use of solvents, suitable solvents including such common organics as heptane, benzene and chloroform.

The curing formulation used herein consists of an unsaturated polycarboxylic anhydride, an aliphatic polyhydroxy compound, and a free radical initiator. By selection of the appropriate anhydride, polyol and peroxide, and by adjusting the relative proportions used, cured resins of an extremely broad range of properties may be obtained.

As the anhydride component of the curing agent, a wide variety of unsaturated polycarboxylic anhydrides containing reactive double bonds may be used, alone or in combination with each other or with saturated anhydrides. Typical reactive unsaturated anhydrides include maleic, monosubstituted maleic such as chloromaleic and citraconic, itaconic, bicyclo-(2,2,1)-5-heptene-2,3-dicarboxylic, bicyclo-(2,2,1)-5-methyl-5-heptene-2,3-dicarboxylic and many other unsaturated anhydrides having reactive double bonds, of varied structure and properties.

These anhydrides may be used in combination with other aliphatic, alicyclic and aromatic polycarboxylic anhydrides, to prepare compositions having specific curing characteristics and cured properties. For example, compositions may be prepared where as much as 95% of the anhydride component consists of a saturated anhydride, or an anhydride containing relatively unreactive double bonds, since the presence of even 5% of reactive double bonds in the anhydride contributes substantially to the improved properties of the product. Typical anhydrides in combination include succinic, dodecenylsuccinic, octenylsuccinic, di- and tetrachlorophthalic, tetrahydrophthalic, hexahydrophthalic, dichloromaleic, pyromellitic, bicyclo-(2,2,1)-5-heptene-1,4,5,6,7,7 - hexachlor - 2,2 - dicarboxylic, and many others. The corresponding di- or polycarboxylic acids may be used in place of all or a portion of the anhydrides to increase the rate of cure. Again, substituents such as halogen or other groups may be incorporated for special applications.

The polyol component of this invention is preferably an aliphatic polyhydric alcohol. Illustrative of polyols which may be used, alone or in combination, are the glycols and glycol ethers such as ethylene glycol, propylene glycol, triethylene glycol, dipropylene glycol, 1,4-butanediol, 2,3-butanediol, 1,6-hexanediol, 1,2-octanediol, cyclopentanediols, cyclohexanediols, and long chain diols of straight and branched chains, which chains may contain aromatic rings, such as xylylene glycol and dimethylxylylene glycol. Higher polyols such as glycerol, 3-methylolpentane - 1,5 - diol, tetrahydroxybutane, pentaerythritol, polypentaerythritol, polyallyl alcohol, dextrose, sorbitol, mannitol and trimethylolbenzene may also be used, as well as a large number of other dihydroxy and polyhydroxy compounds. Unsaturated polyols, such as 2-butene-1,4-diol, dihydroxycyclopentene and tetrahydroxycyclohexene may also be used. If the unsaturated polyol contains reactive double bonds, this polyol may be used in combination with or in place of the unsaturated function of the anhydride. Substituents such as halogen, nitro, amido or other functional groups may also be incorporated to impart particular properties to the product.

With most anhydride and polyol combinations, the amount of anhydride used should be at least equivalent to the amount of aliphatic polyol used. By equivalent amount is meant equivalent number of reactive groups; thus a simple anhydride contains two reactive groups, and a glycol also contains two reactive groups. It is usually preferred to use excess anhydride equivalents over polyol equivalents for best results. When equivalent amounts of anhydride and polyol are used the rate of cure is lower, and may be accelerated by using an acid catalyst. When excess polyol is used, a reasonable rate of cure may still be obtained by using an acid catalyst, but the properties of the products are in general inferior.

For most use, excellent results are obtained using aliphatic glycols in combination with aliphatic unsaturated dicarboxylic anhydrides, with variations in the chain length of the glycol providing a simple means for controlling the properties of the cured polymer. The relative amounts of anhydride and glycol employed depend on the particular components and the properties desired in both the cured and uncured combination. With lower aliphatic glycols and anhydrides, it has been found that best results are generally obtained in the range of about 3 to 4 equivalents of anhydride per equivalent of glycol, although good results have also been obtained using a large excess of anhydride, and even at 9 or 10 excess anhydride equivalents improved products have resulted, at a very rapid reaction rate.

The total amount of combined anhydride plus polyol required for optimum properties in the cured epoxypolybutadiene composition depends on the degree of epoxidation of the epoxypolybutadiene, and also on the particular curing combination used. In general, one epoxide equivalent of epoxypolybutadiene, that is, the amount of epoxypolybutadiene containing one atom of epoxy oxygen, requires a total amount of anhydride plus polyol containing at least one equivalent of reactive groups. As previously defined, a simple anhydride and a simple glycol each contains two reactive groups, and thus each contains two equivalents of reactive groups—a simple anhydride plus a simple glycol, combined, contain a total of four reactive groups.

Where less than one equivalent of total reactive groups in the anhydride plus polyol is used per epoxide equivalent of epoxypolybutadiene, the properties of the cured product are usually inferior; although some improvement over results obtained on curing with anhydrides or polyols alone is observed using as little as half the theoretical amount of curing agent, and there may indeed by cases where such a combination is desired.

As the amount of total anhydride plus polyol used is increased, the flexural strength, tensile strength, heat stability and other properties of the cured product are improved. Excellent results are obtained when a total of about 1.25 to 2.5 equivalents of total reactive groups in the polyol and anhydride are used per atom of epoxy oxygen in the epoxypolybutadiene, and useful products are obtained in the range of about 0.5 to over 4 equivalents of reactive groups in the curing agent per epoxy oxygen.

The third essential component of the curing formulation, and that which contributes to the particular advantages which characterize the instant discovery, is a free radical initiating agent. This may be any agent which is stable below the curing temperature, but which liberates free radicals into the system under the curing conditions. These free radical initiators are of the same type as is normally used in the catalysis of free radical polymerization reactions, the most common of which are peroxygen compounds, such as aliphatic, aromatic and inorganic peracids, salts and esters of the peracids, peroxides and hydroperoxides. It is preferred herein to use organic peroxy compounds which are compatible with and soluble in the other components of the curing system. Examples of such peroxides include t-butyl perbenzoate, benzoyl peroxide, dicumyl peroxide, 2,5-bis(tert.-butylperoxy)-2,5-dimethylhexane, methyl ethyl ketone peroxide, di-t-butyl diperphthalate, di-t-butyl peroxide, p-menthane hydroperoxide, acetyl peroxide, 2,2'-azo-bisisobutyronitrile, pinane hydroperoxide, 2,5-dimethylhexane-2,5-dihydroperoxide, cumene hydroperoxide, cyclohexane peroxide, and many others. Peroxidated polybutadiene or epoxypolybutadiene may also be used as the catalyst.

The decomposition temperatures of such free radical initiators may be in the broad range of about 25 to 200° C., since the polyol-anhydride cure system may be so formulated as to be reactive throughout this range. Most of the peroxides listed above are active in the preferred range of 100–175° C., since this is a convenient temperature range for obtaining completely cured products within a reasonable time. If curing is to be effected in two or more stages by progressively increasing the temperature, a combination of two or more appropriately selected free radical initiators may be used. The decomposition of the peroxide is promoted by the use of various well-known additives, such as acids or amines. The decomposition temperature is, in fact, progressively lowered during the curing step by acid formed during the reaction.

The amount of peroxide used may vary over a wide range, and from 0.01 to 5% of peroxide, by weight of total curing agent (polyol, anhydride and peroxide), may be used. In general, excellent results are obtained in a preferred range of about 0.2 to 2% of peroxide. When less than an effective amount of peroxide is present, the results are the same as if the anhydride-polyol system alone were used. There is no advantage to the use of excess peroxide, and in fact large excesses should be avoided, to avoid contamination of the polymer.

The components of the composition of this invention may be combined in any convenient way. Any two or more may be premixed prior to blending into the resin which itself may contain one or more of the cure agents. Alternately one or more of the cure agents may be blended with the resin prior to addition of the remaining prescribed cure agents.

Care should be taken, however, if it is desired to use a polyol or anhydride of high melting point in the curing system, since the necessary mixing temperature for homogeneity may substantially shorten the pot life of the combination. On the other hand, it has been found that the viscosity of the mixture is lowered as the curing agents are added, thereby permitting the use of larger amounts of curing agents, or those of higher molecular weights, while retaining the free-flowing properties of the composition. It is also possible to use solvents or diluents to lower the viscosity of the mixture and thus permit combination of components at lower temperatures.

The polyol may be mixed first with the epoxypolybutadiene, and the anhydride then added to the mixture. To obtain a homogeneous mixture, it is convenient to melt the anhydride, and raise the temperature of the polyol-resin mixture enough to allow addition of the anhydride without precipitation. The temperature of the mix may then be lowered to room temperature, where gelation may or may not occur, depending on the curing agents used.

As an alternative procedure, the anhydride may be added first to the base resin, followed by addition of the polyol. However, since anhydrides alone react rapidly with these resins, additional precautions are necessary.

As a third alternative, the polyol and anhydride may be premixed before addition to the base resin. This procedure has been found to substantially increase the rate of cure of the resin. Thus, if room temperature cure is desired, or a high rate of cure at elevated temperatures, this procedure is followed. Premixing is most conveniently accomplished at the temperature at which both polyol and anhydride are liquid, and the liquid mixture is then added to the epoxypolybutadiene resin. Temperatures higher than necessary to obtain this liquid state should be avoided. The peroxide catalyst should not be present during this premixing.

Mixing of the components should of course be carried out at a temperature below the decomposition point of the peroxide. In other words, the peroxide used in the curing formulation should be so selected that it does not decompose at the temperatures at which it is desired to prepare and, if necessary, store the composition before curing. The curing reaction is preferably carried out at low to moderate temperature, to facilitate control of the reaction rate, which increases with increased temperature. A useful procedure is to allow the composition to stand for a brief period at temperatures between about 0° C. and 75° C., then raising the temperature to about 75–175° C. to complete the reaction. Many variations in curing procedure are possible. The curing time varies with the starting materials and the operating conditions. In general, a reaction period of one to six hours at the preferred temperature range is sufficient, although longer periods are sometimes required for maximum properties.

It is believed that the presence of the free radical initiator in the curing system has the effect of enhancing crosslinking through the carbon-carbon double bonds of the epoxypolybutadiene base resin. This would have the effect of increasing the extent of intermolecular bonding in the cured resins, thus enhancing the thermal stability of the cured product. In addition, the rate of cure of the resin is accelerated. Cured products having higher heat distortion temperatures are obtained than in the absence of the peroxides. The cure time is substantially shortened, and the product is substantially more resistant to the reaction of solvents, boiling water, and harsh chemicals. The products are charcaterized by improved color and translucency in contrast with products derived from epoxypolybutadienes cured with anhydrides or anhydride-polyol mixtures alone. The increase in the cross-link density of the product and the decrease in residual unsaturation results in susbtantially improved resistance to oxidation of the product.

The products of this invention are useful in a variety of ways, as in potting and encapsulating of electronic assemblies and other casting applications, in laminates and in protective coatings and other resinous applications, either alone or in combination with other resins. They may be combined with glass fibers or other reinforcing agents, with plasticizers, flexibilizers, fillers, extenders, pigments and dyes, and many other materials, for specific applications.

Illustrated below are the preparation and properties of a number of types of epoxypolybutadienes useful in the practice of this invention. All parts are by weight unless otherwise indicated.

EPOXYPOLYBUTADIENE "A"

Butadiene was polymerized as follows: A dispersion of sodium in refined kerosene was prepared by agitating 100 parts of sodium, 100 parts of refined kerosene and one part of dimer acid for one hour at 105–110° C. in a homogenizer to produce sodium particles of 2–10 microns in size. About 4 parts of sodium as a 46% dispersion in kerosene and 88 parts of benzene were charged to an agitated reactor, the temperature was raised to 92° C., and 5.0 parts of technical grade butadiene was added to initiate the reaction. The temperature was maintained at about 90° C. while 36.0 parts of butadiene was added continually. The reaction was continued until the monomer was completely reacted, as indicated by a drop in pressure. The reactants were then cooled to 50° C., and glacial acetic acid was added to destroy the catalyst. The mixture was filtered through soda ash, and the filtrate was stripped of volatiles over a temperature range of 19–55° C. at 23–57 mm. Hg. The residue was an oily polybutadiene, having an iodine number of 320 and a melt viscosity of 42 poises at 25° C.

This polybutadiene was expoxidized as follows: About 400 parts of polybutadiene, 400 parts of toluene, 168 parts of Dowex resin 50 X–8 (a sulfonated styrene-divinylbenzene polymer cross-linked with 8% divinylbenzene) and 81 parts of glacial acetic acid were charged to an agitated flask. About 186 parts of 50% hydrogen peroxide was added slowly to the mixture. The temperature was maintained at 65° C. for 5.8 hours. The mixture was then cooled to 30° C., and filtered from the ion exchange resin. The solution was neutralized with sodium carbonate, and filtered to remove the sodium acetate. The filtrate was heated to 47° C. at 125 mm. Hg to remove the water azeotropically, and then stripped of toluene at 7 mm. Hg up to 85° C. The epoxypolybutadiene obtained as residue had an epoxy oxygen content of 5.2%, iodine number of 201, and melt viscosity of 15,700 poises at 25° C. extrapolated to zero shear.

EPOXYPOLYBUTADIENE "B"

Butadiene was polymerized as follows: About 4.3 parts of sodium as a 46% dispersion in kerosene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383, melt viscosity of 16.4 poises at 25° C. extrapolated to zero shear, and molecular weight of 980.

This polybutadiene was expoxidized as follows: About 100 parts of liquid polybutadiene, 100 parts of benzene, 41.6 parts of Dowex resin 50 X–12 (a sulfonated styrene-divinylbenzene polymer cross-linked with 12% divinylbenzene) and 16.2 parts of glacial acetic acid were heated with agitation to 60° C. About 70 parts of 50% hydrogen peroxide was then added, over a period of 3 hours. The temperature was maintained at 60° C. for an additional 2 hours, the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene at 35° C. and 60 mm. Hg. The epoxypolybutadiene obtained as residue exhibited an iodine number of 176, an hydroxyl content of 1.6%, an epoxy oxygen content of 8.6% and a melt viscosity of 980 poises extrapolated to zero shear at 25° C.

EPOXYPOLYBUTADIENE "C"

The polybutadiene prepared in "B" above was epoxidized as follows: About 100 parts of this polybutadiene, 100 parts of toluene, 41.6 parts of Dowex resin 50 X–8 (a sulfonated styrene-divinylbenzene polymer cross-linked with 8% divinylbenzene) and 16.2 parts of glacial acetic acid were charged to an agitated reaction flask, and heated to 60° C. About 70 parts of 50% hydrogen peroxide was added to the mixture over a period of 1.5 hours, at 60–70° C. Heating at 60–70° C. was continued for 15 hours, to increase the hydroxy content and thereby increase the viscosity of the product. The mixture was then cooled to 25° C., filtered through fiber glass, and neutralized with about 25 parts of sodium carbonate. The oily layer was separated, and water was removed by azeotropic distillation with 125 parts of benzene, followed by removal of volatiles at 35° C. and 60 mm. Hg. The epoxypolybutadiene residue had an epoxy oxygen content of 9.3%, an hydroxy content of 4.1%, an iodine number of 154 and a melt viscosity of 9000 poises at 25° C. extrapolated to zero shear.

EPOXYPOLYBUTADIENE "D"

The polybutadiene prepared in "A" above was epoxidized as follows: One hundred parts of this polybutadiene, 100 parts of toluene, 40 parts of Dowex resin 50 X–8 (a sulfonated styrene-divinylbenzene copolymer cross-linked with 8% divinylbenzene), and 22 parts of glacial acetic acid were charged into an agitated flask. About 48 parts of 50% hydrogen peroxide was added to the mixture. The ingredients were allowed to react at 65° C. until essentially all of the peroxide was depleted. The batch was filtered through a cloth to remove the ion exchange resin, and a slurry of 20 parts of sodium carbonate in 100 parts of toluene and 75 parts of sodium sulfate were added to the filtrate. After allowing the inorganic cake to settle, the oil layer was separated by filtration. About 25 parts of magnesium sulfate was added to the filtrate to clarify the polymer solution, which was then filtered, and stripped of volatiles for eight hours at 80° C. and 29 mm. Hg. The epoxypolybutadiene obtained as residue had an epoxy oxygen content of 6.7%, iodine number of 230 and viscosity of about 16,000 poises at 25° C. at zero shear.

EPOXYPOLYBUTADIENE "E"

The polybutadiene prepared in "A" above was epoxidized as follows: About 600 parts of this polybutadiene, 600 parts of benzene, 60 parts of Dowex resin 50 X–8 (a sulfonated styrene-divinylbenzene copolymer cross-linked with 8% divinylbenzene), and 23.3 parts of glacial acetic acid were mixed in a reactor. About 100 parts of 50% hydrogen peroxide was added slowly to the mixture at 61° C. over a period of 38 minutes. The ingredients were allowed to react for a total of about four hours. The mixture was filtered through fiber glass to remove the ion exchange resin and washed with an equal volume of water. After separation of the water, the acetic acid was neutralized with sodium carbonate and the acetate was removed by filtration. The benzene-polymer solution was stripped to remove the solvent. The epoxypolybutadiene obtained as residue had an epoxy oxygen content of 2.2%.

EPOXYPOLYBUTADIENE "F"

The polybutadiene prepared in "A" above was epoxidized as follows: About 400 parts of this polybutadiene, 400 parts of benzene, 20 parts of Dowex resin 50 X–8 (a sulfonated styrene-divinylbenzene copolymer cross-linked with 8% divinylbenzene), and 7.8 parts of glacial acetic acid were added to a three-necked flask. About 33.4 parts of 50% hydrogen peroxide was added slowly to the mixture at 61° C. over a period of 25 minutes. The ingredients were allowed to react for a total of about 2.5 hours. The mixture was filtered through fiber glass to remove the ion exchange resin and washed with an equal volume of water. After separation of the water, the acetic acid was neutralized with sodium carbonate and the acetate was removed by filtration. The benzene-polymer solution was stripped to remove the solvent. The epoxypolybutadiene obtained as residue had an epoxy oxygen content of 1.0%.

The following examples illustrate the curing of the typical epoxypolybutadienes described above. Mechanical and electrical properties of the specific products described in the examples were determined according to standard ASTM tests. All parts are by weight unless otherwise indicated.

*Example 1*

To 50 parts of epoxypolybutadiene "A" was added 3.69 parts of 2,3-butylene glycol. The mixture was warmed to 35° C. and 12.06 parts of maleic anhydride at 60° C. was added. Then, 0.25 part of 2.5-bis(tert.-butylperoxy)-2,5-dimethylhexane was blended, and the mixture was cured for two hours at 80° C., one hour at 115° C. and 24 hours at 155° C. The casting exhibited heat distortion temperatures of 180° C. and 200° C. at deflections of 10 and 16 mils.

The above experiment was repeated, omitting the peroxide, as follows: To 50 parts of epoxypolybutadiene "A" was added 3.69 parts of 2,3-butylene glycol. The mixture was warmed to 35° C. and 12.06 parts of maleic anhydride at 60° C. was added, and the mixture was cured for two hours at 80° C., one hour at 115° C. and 24 hours at 155° C. The product exhibited heat distortion temperatures of 101° C. and 117° C. at 10 and 20 mils deflection.

Example 2

To 100 parts of epoxypolybutadiene "B" was added a solution of 13.5 parts of maleic anhydride and 10.5 parts of propylene glycol, which had been heated for five minutes at about 65° C. Twenty parts of high abrasion furnace black were added, then 0.5 part of boron trifluoride-monoethylamine and 2.0 parts of benzoyl peroxide. After holding for one day at room temperature and heating one hour at 115° C., a firm cured casting was obtained.

Example 3

To 70 parts of epoxypolybutadiene "C" at 60° C. was added 6.9 parts of 2,3-butylene glycol at 50° C. and 0.7 part of benzoyl peroxide. The mixture, cooled to 35° C., was blended with molten maleic anhydride at 60° C. and spread on 12 plies of 0.0085" thick long-shaft satin weave glass cloth having a vinyl silane finish. After 9 minutes at 135° C. and 25 p.s.i., the laminate was rigid. After 2 hours at 155° C., the laminate exhibited a flexural strength of 56,300 p.s.i., elongation of 1.9% and flexural modulus of 3,010,000 p.s.i. After the laminate had been submerged in boiling water for eight days, the values were 30,700 p.s.i. flexural strength, 1.5% elongation and 2,730,000 p.s.i. flexural modulus.

Following the above procedure but omitting the benzoyl peroxide from the formulation produced a laminate which, after the curing cycle of 9 minutes at 135° C. and 2 hours at 155° C., and 8 days in boiling water, had a flexural strength of 22,700 p.s.i., elongation of 1.1% and flexural modulus of 2,250,000 p.s.i.

Example 4

A blend containing equal parts of epoxypolybutadiene "B" and epoxypolybutadiene "C" was prepared, and found to have an average epoxy oxygen content of 9.0% and a viscosity of 2600 poises extrapolated to zero shear at 25° C. To 90 parts of this blend at room temperature was added 8.3 parts of 1,4-butenediol. The mixture was warmed to 35° C. and 27.8 parts of maleic anhydride at 60° C. was admixed. A mixture of 0.45 part of dicumyl peroxide and 0.45 part 2,5 - bis-(tert.-butylperoxy)-2,5-dimethylhexane was added at room temperature. The mixture was cured by heating for two hours at 60° C., one hour at 115° C. and 24 hours at 155° C. The cured casting had a heat distortion temperature of above 200° C., at a maximum deflection of 2.4 mils. After submersion in boiling water for 8 days the samples showed heat distortion temperatures of 102° C. at 10 mils deflection and 129° C. at 20 mils deflection.

Example 5

To 50 parts of the blend of epoxypolybutadiene "B" and "C" described in Example 4 was added 2.34 parts of 2,3-butylene glycol. A mixture of 9.93 parts each of maleic and hexahydrophthalic anhydrides was heated to 60° C. until the solids melted, then cooled to room temperature and added to the resin-glycol blend. Then 0.25 part each of 2,5-bis(tert.-butylperoxy)-2,5-dimethylhexane and di-tert.-butyl peroxide were added. After evacuating the mixture for 15 minutes at 35° C., curing was conducted for two hours at 80° C., two hours at 115° C. and 24 hours at 155° C. The casting obtained exhibited a heat distortion temperature of 200° C. at a deflection of 9.5 mils.

Example 6

To 50 parts of the blend of epoxypolybutadiene "B" and "C" described in Example 4 was added 6.25 parts of 2,3-butylene glycol. The mixture was warmed to 35° C. and 20.6 parts of maleic anhydride at 60° C. was introduced. Then 0.25 part of 2,5-bis(tert.-butylperoxy)-2,5-dimethylhexane was added, and the mixture was evacuated for fifteen minutes at 35° C. prior to curing over a cycle of two hours at 60° C., two hours at 105° C. and 24 hours at 155° C. The casting produced exhibited a heat distortion temperature of over 200° C. at a deflection of 3.8 mils.

Example 7

To 50 parts of the blend of epoxypolybutadiene "B" and "C" described in Example 4 was added 7.0 parts of ethylene glycol. The mixture was warmed to 35° C., and 16.4 parts of maleic anhydride at 60° C. was added. The blend was cooled to room temperature and 0.25 part each of 2,5-bis(tert.-butylperoxy)-2,5-dimethylhexane and di-tertiary butyl peroxide was added. The blend was evacuated 15 minutes at 35° C. and then cured for two hours each at 60° C. and at 115° C. and then 24 hours at 155° C. The product exhibited heat distortion temperatures of 143° C. and 177° C. at 10 and 20 mils of deflection.

Example 8

The following example illustrates the effect of the presence and absence of a peroxide and of an unsaturated anhydride on the system hexahydrophthalic anhydride/glycerol. To 40 parts of the blend of epoxypolybutadiene "B" and "C" described in Example 4 was added 3.9 parts of glycerol. The mixture was warmed to 35° C. and 19.4 parts of hexahydrophthalic anhydride at 60° C. and 0.20 part dicumyl peroxide were added, and the mixture cured for two hours each at 70° C., two hours at 115° C., and 24 hours at 155° C. The product exhibited heat distortion temperature values at 89°, 94° and 100° C. at deflections of 10, 20 and 30 mils.

The above procedure was repeated, replacing half the hexahydrophthalic anhydride with maleic anhydride, and omitting the peroxide. Heat distortion temperatures for the product were 93° and 99° C. at deflections of 10 and 20 mils.

A third comparison was run, employing equal parts of hexahydrophthalic anhydride and maleic anhydride as above, glycerol, and 0.20 part dicumyl peroxide. Proportions of reactants and curing conditions were as above. The product exhibited heat distortion temperatures of 180° and 200° C. at 10 and 15 mils deflection.

Example 9

To 50 parts of the blend of epoxypolybutadiene "B" and "C" described in Example 4 was added 4.68 parts of 2,3-butylene glycol. The mixture was warmed to 35° C. and 14.5 parts of maleic anhydride at 60° C. was admixed. Then 0.25 part of tertiary butyl perbenzoate was added, the blend was evacuated for 15 minutes at 35° C., and cured two hours at 80° C., one hour at 115° C. and 24 hours at 155° C. The cured casting exhibited heat distortion temperatures of 110°, 152° and 200° C. at 10, 20 and 30 mils deflection.

Repeating the above experiment, omitting the peroxide, produced a resin having heat distortion temperature values of 90°, 101° and 110° C. at deflections of 10, 20 and 40 mils. The cured product contained many cracks after an 8-day water-boil test and broke easily under slight pressure.

Example 10

To 50 parts of epoxypolybutadiene "D" was added 3.30 parts of ethylene glycol. The mixture was warmed to 35° C. and 17.85 parts of methyl maleic anhydride at room temperature was added. Then 0.50 part each of 2,5-bis-(tert.-butylperoxy)-2,5-dimethylhexane and di-tertiary butyl peroxide was added. The blend was evacuated 15 minutes at 35° C., and then cured for two hours at 80° C., one hour at 115° C. and 24 hours at 155° C. The product exhibited heat distortion temperature values of 99°, 125° and 164° C. at deflections of 10, 20 and 40 mils.

Example 11

To 50 parts of epoxypolybutadiene "D" was added 4.1 parts of cyclohexanediol. The mixture was warmed to 35° C. and 12.06 parts of maleic anhydride at 60° C. was added. Then, 0.25 part of di-tert.-butyl peroxide was added and the blend was evacuated for 15 minutes at 35° C. The mixture was then cured at a cycle of two hours at 80° C., one hour at 115° C. and 24 hours at 155° C. The cured casting exhibited heat distortion temperatures of 160° C. and 200° C. at deflections of 10 and 25 mils.

*Example 12*

To 25 parts of epoxypolybutadiene "D" was added 1.83 parts of glycerol, 6.70 parts of methyl maleic anhydride, 0.25 part of t-butyl perbenzoate and 0.25 part of 2,5-bis(tert.-butylperoxy) - 2,5 - dimethylhexane. The mixture was cured over a cycle of two hours at 80° C., one hour at 115° C. and 24 hours at 155° C. The cured product exhibited heat distortion temperatures of 112°, 182° and 200° C. at deflections of 10, 20 and 33 mils.

Repeating the above procedure, but omitting the peroxide, gave a cured product which showed heat distortion temperatures of 65°, 67° and 71° C. at deflections of 10, 20 and 40 mils.

*Example 13*

To 25 parts of epoxypolybutadiene "E" was added 0.77 part of 2,3-butylene glycol. The mixture was warmed to 35° C. and 2.52 parts of maleic anhydride was added at 60° C. About 0.5 part of 2,5-bis(tert.-butylperoxy)-2,5-dimethylhexane was added and the mixture was cured for two hours at 80° C., four hours at 115° C. and 24 hours at 155° C. The cured product exhibited a heat distortion temperature of 70° and 200° C. at deflections of 10 and 13.4 mils.

Repeating the above experiment, omitting the peroxide, produced a product which was very flexible, and distorted to a deflection of over 40 mils at 35° C.

*Example 14*

To 30 parts of epoxypolybutadiene "F" was added 0.29 part of ethylene glycol. The mixture was warmed to 35° C. and 1.38 parts of maleic anhydride at 60° C. was added. Then, 0.6 part of di-tert.-butyl peroxide was added, and the mixture was cured for two hours at 80° C., four hours at 115° C. and 24 hours at 155° C. The product exhibited a shore hardness of 93 on the A scale.

Repeating the above experiment, omitting the peroxide, gave a product having a shore hardness of 55 on the A scale.

It is apparent that this invention is susceptible to numerous modifications within the scope of the disclosure, and it is intended to include such variations within the scope of the following claims.

We claim:

1. A resin composition comprising the reaction product of an epoxidized polybutadiene containing polymerizable double bonds and 1–10% by weight of epoxy oxygen and a curing agent comprising 0.5 to 4 equivalents per epoxy oxygen of, in combination, an aliphatic polyhydric alcohol containing 2–6 carbon atoms and an unsaturated polycarboxylic anhydride containing at least one polymerizable double bond, said curing agent containing 3–10 equivalents of anhydride per equivalent of alcohol, said equivalents being calculated on the basis that one epoxy oxygen atom is equivalent to one hydroxyl or one carboxyl group, and 0.01–5% by weight, based upon the curing agent, of an organic peroxide.

2. The composition of claim 1, wherein said polyhydric alcohol is a lower alkylene glycol.

3. The composition of claim 1, wherein said polyhydric alcohol is ethylene glycol.

4. The composition of claim 1, wherein said polyhydric alcohol is propylene glycol.

5. The composition of claim 1, wherein said polyhydric is butylene glycol.

6. The composition of claim 1, wherein said polyhydric alcohol is glycerol.

7. The composition of claim 1, wherein said polyhydric alcohol is butenediol.

8. The composition of claim 1, wherein said polyhydric alcohol is cyclohexanediol.

9. The composition of claim 1, wherein said anhydride is maleic anhydride.

10. The composition of claim 1, wherein said anhydride is citraconic anhydride.

11. The composition of claim 1, wherein said organic peroxide decomposes at 100–175° C.

12. The composition of claim 1, wherein said organic peroxide is di-tertiary butyl peroxide.

13. The composition of claim 1, wherein said organic peroxide is 2,5-bis(tert.-butylperoxy)-2,5-dimethylhexane.

14. A resin composition comprising the reaction product of an epoxidized polybutadiene containing polymerizable double bonds and 4–10% by weight of epoxy oxygen and a curing agent comprising 1.25–2.5 equivalents per epoxy oxygen of, in combination, an aliphatic glycol containing 2–6 carbon atoms and an unsaturated dicarboxylic anhydride containing at least one polymerizable double bond, said curing agent containing 3–10 equivalents of anhydride per equivalent of glycol, said equivalents being calculated on the basis that one epoxy oxygen atom is equivalent to one hydroxyl or one carboxyl group, and 0.01–5% by weight, based upon the curing agent, of an organic peroxide.

15. The method of curing an epoxidized polybutadiene containing polymerizable double bonds and 1–10% by weight of epoxy oxygen which comprises reacting said epoxidized polybutadiene with 0.5–4 equivalents per epoxy oxygen of, in combination, an aliphatic polyhydric alcohol containing 2–6 carbon atoms and an unsaturated polycarboxylic acid anhydride containing at least one polymerizable double bond, said curing agent containing 3–10 equivalents of anhydride per equivalent of alcohol, said equivalents being calculated on the basis that one epoxy oxygen atom is equivalent to one hydroxyl or one carboxyl group, and 0.01–5% by weight, based upon the curing agent, of an organic peroxide at a temperature of 75–175° C. for a period of at least one hour.

16. The method of curing an epoxidized polybutadiene containing polymerizable double bonds and 4–10% by weight of epoxy oxygen which comprises reacting said epoxidized polybutadiene with 1.25–2.5 equivalents per epoxy oxygen of, in combination, an aliphatic glycol containing 2–6 carbon atoms and an unsaturated dicarboxylic anhydride containing at least one polymerizable double bond, said curing agent containing 3–10 equivalents of anhydride per equivalent of glycol, said equivalents being calculated on the basis thta one epoxy oxygen atom is equivalent to one hydroxyl or one carboxyl group, and 0.1–5% by weight, based upon the curing agent, of an organic peroxide at a temperature of 75–175° C. for a period of at least one hour.

17. A laminated structure comprising laminae coated and impregnated with a composition comprising the reaction product of an epoxidized polybutadiene containing polymerizable double bonds and 1–10% by weight of epoxy oxygen and a curing agent comprising 0.5 to 4 equivalents per epoxy oxygen of, in combination, an aliphatic polyhydric alcohol containing 2–6 carbon atoms and an unsaturated polycarboxylic anhydride containing at least one polymerizable double bond, said curing agent containing 3–10 equivalents of anhydride per equivalent of alcohol said equivalents being calculated on the basis that one epoxy oxygen atom is equivalent to one hydroxyl or one carboxyl group, and 0.01–5% by weight, based upon the curing agent, of an organic peroxide.

References Cited in the file of this patent

UNITED STATES PATENTS

| | | |
|---|---|---|
| 2,634,256 | Sparks | Apr. 7, 1953 |
| 2,720,500 | Cody | Oct. 11, 1955 |
| 2,829,130 | Greenshan et al. | Apr. 1, 1958 |
| 2,829,135 | Greenshan et al. | Apr. 1, 1958 |
| 2,848,433 | Eirich | Aug. 19, 1958 |
| 2,890,195 | Phillips et al. | June 9, 1959 |
| 2,949,441 | Newey | Aug. 16, 1960 |